United States Patent [19]

Santiago

[11] Patent Number: 5,249,365
[45] Date of Patent: Oct. 5, 1993

[54] TELESCOPING LEVEL

[76] Inventor: John Santiago, 7 Sipley Rd., Blairstown, N.J. 07825

[21] Appl. No.: 996,622

[22] Filed: Dec. 24, 1992

[51] Int. Cl.⁵ .............................................. G01C 9/28
[52] U.S. Cl. ........................................ 33/374; 33/451
[58] Field of Search ................. 33/374, 375, 376, 451, 33/464, 809

[56] References Cited

U.S. PATENT DOCUMENTS

| | | | |
|---|---|---|---|
| 686,360 | 11/1901 | Smiddy et al. | 33/374 |
| 1,413,056 | 4/1922 | Parrish et al. | 33/374 |
| 2,356,544 | 8/1944 | Swanson | 33/809 |
| 2,551,524 | 5/1951 | Bullivant | 33/374 |
| 3,104,477 | 9/1963 | Edwill | 33/374 |
| 4,099,331 | 7/1978 | Peterson et al. | 33/374 |
| 4,130,943 | 12/1978 | Talbot | 33/374 |
| 4,186,493 | 2/1980 | Khan et al. | 33/374 |
| 4,399,616 | 8/1983 | Jansson | 33/451 |
| 4,894,925 | 2/1990 | Langmaid | 33/374 |

FOREIGN PATENT DOCUMENTS 0646251  11/1984  Sweden .................... 33/374

Primary Examiner—Thomas B. Will
Attorney, Agent, or Firm—Anthony F. Cuoco

[57] ABSTRACT

A level includes a plurality of telescoping members locked in a telescoped position, whereby the effective length of the level is adjustable so that the level is useful in establishing horizontal for a structure of an extended length and for establishing a plumb line.

8 Claims, 4 Drawing Sheets

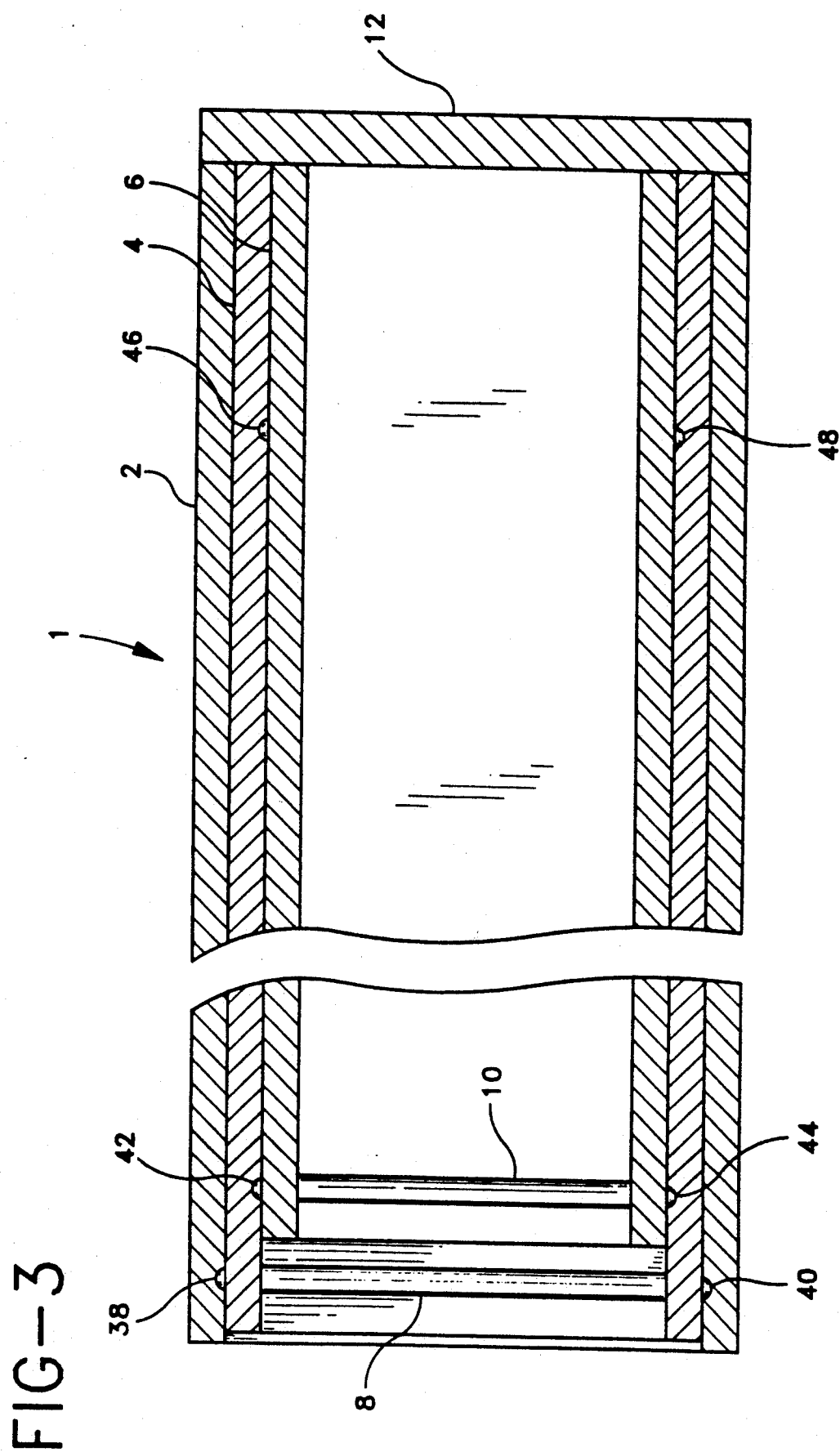

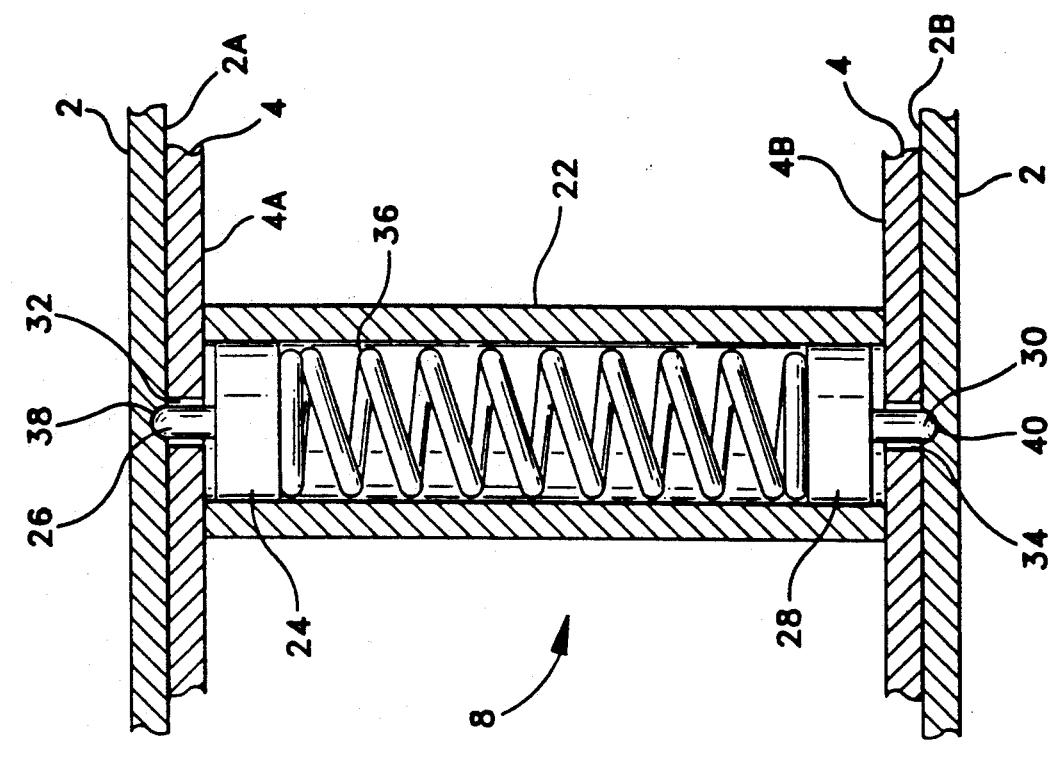

TELESCOPING LEVEL

BACKGROUND OF THE INVENTION

This invention relates generally to levels of the type for establishing a horizontal line or plane by means of a bubble in a liquid that shows adjustment to the horizontal by movement to the center of a slightly bowed glass tube. More particularly, this invention relates to a level of the type described whereby the level has telescoping components for increasing the effective length of the level.

Levels are commonly used to insure that structures are in a horizontal plane. Prior to the present invention, levels have been of a finite length which has been limited by practical considerations such as portability and storage.

It is often necessary to establish horizontal for extended structural lengths. This has necessitated repositioning the level along the extended length of the structure, which is inconvenient and leads to inaccuracies.

The present invention avoids these disadvantages by providing a level having an adjustable length. That is to say, the length of the level is adjustable commensurate with the extended structural length for which horizontal must be established.

SUMMARY OF THE INVENTION

This invention contemplates a telescoping level, whereby the length of the level is adjustable. The level includes a plurality of consecutive components, each of which receives an immediately consecutive component of the plurality of the components in inwardly and outwardly telescoping fashion. When each of the telescoping components is fully inwardly telescoped in its receiving component the level assumes a finite length. The length of the level is adjusted by telescoping one or more of the telescoping components outwardly from its receiving component. The arrangement is such that the telescoping components are locked in the fully inwardly telescoped position and are locked in an outwardly telescoped position. With the arrangement described a first of the components has the largest cross-section of the plurality of components and a last of said components has the smallest cross-section of said plurality of components. The first component includes a leveling bubble arrangement and a pair of plumb bubble arrangements on a surface thereof. The last component has a plate secured to the extending end thereof and normal to a leveling surface of the first component, which is as large as the cross-section of the first component. The plate is used in conjunction with the first component and the bubble arrangements for establishing horizontal and for establishing a plumb line, as may be required.

BRIEF DESCRIPTION OF THE DRAWINGS

FIG. 3 is a broken longitudinal sectional view showing the components in a fully inwardly telescoped position and generally showing a locking arrangement for the telescoping components.

FIG. 4 is a diagrammatic representation best illustrating the locking arrangement.

DETAILED DESCRIPTION OF THE INVENTION

Figure 1:
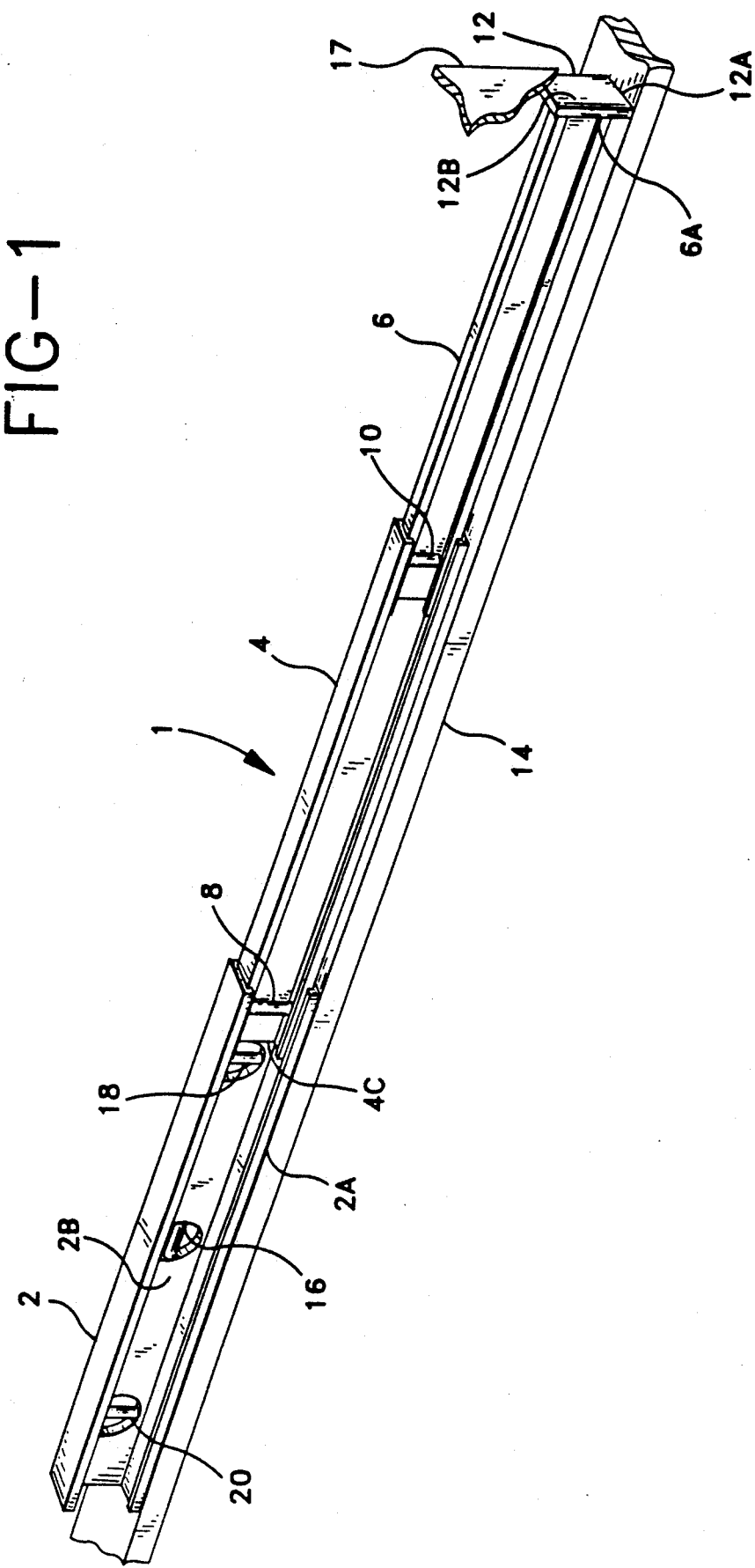
FIG. 1 is a perspective view showing a telescoping level in accordance with the invention wherein the components therein are in a fully outwardly telescoped position.

With reference first to FIG. 1, a telescoping level in accordance with the invention is designated generally by the numeral 1. Telescoping level 1 includes a plurality of consecutive level components shown for purposes of illustration as three in number and designated by the numerals 2, 4 and 6.

Level components 2, 4 and 6, in the preferred embodiment of the invention, are of a C-shaped cross-section. Component 2 which is a first of the plurality of consecutive components has the largest cross-section; component 4 has a slightly smaller cross-section so as to slidingly telescope in and out of component 2; and component 6 which is a last of the plurality of consecutive components has a still slightly smaller cross-section so as to slidingly telescope in and out of component 4.

When components 4 and 6 are in a fully outwardly telescoping position as shown in FIG. 1, component 4 locks in component 2 via a locking arrangement 8 and component 6 locks in component 4 via a like locking arrangement 10. Locking arrangements 8 and 10 will be more fully described with reference to FIGS. 3 and 4.

Component 6 which, when fully telescoped outwardly of member 4, is the furthest extending component, supports a plate 12 on its extending end 6A. Plate 12 is of a size so as to correspond to the largest cross-section, i.e. the cross-section of component 2, and is supported on the end of member 6 so as to be precisely normal to the bottom or leveling edge 2A of component 2.

Thus, with the arrangement described, level 1 is adjustable in length and is useful for establishing horizontal for an extended structure 14 via leveling bubble 16 on the rear surface 2B of component 2. This is accomplished by disposing leveling edge 2A of component 2 and bottom edge 12A of plate 12 which is co-planar with leveling edge 2A of component 2, on structure 14 as shown in FIG. 1.

Plate 12 is also used for establishing a plumb line for a vertical structure 17 via plumb bubbles 18 and 20, one on each side of leveling bubble 16. This is accomplished by disposing outer surface 12B of plate 12 against vertical structure 17.

Figure 2:
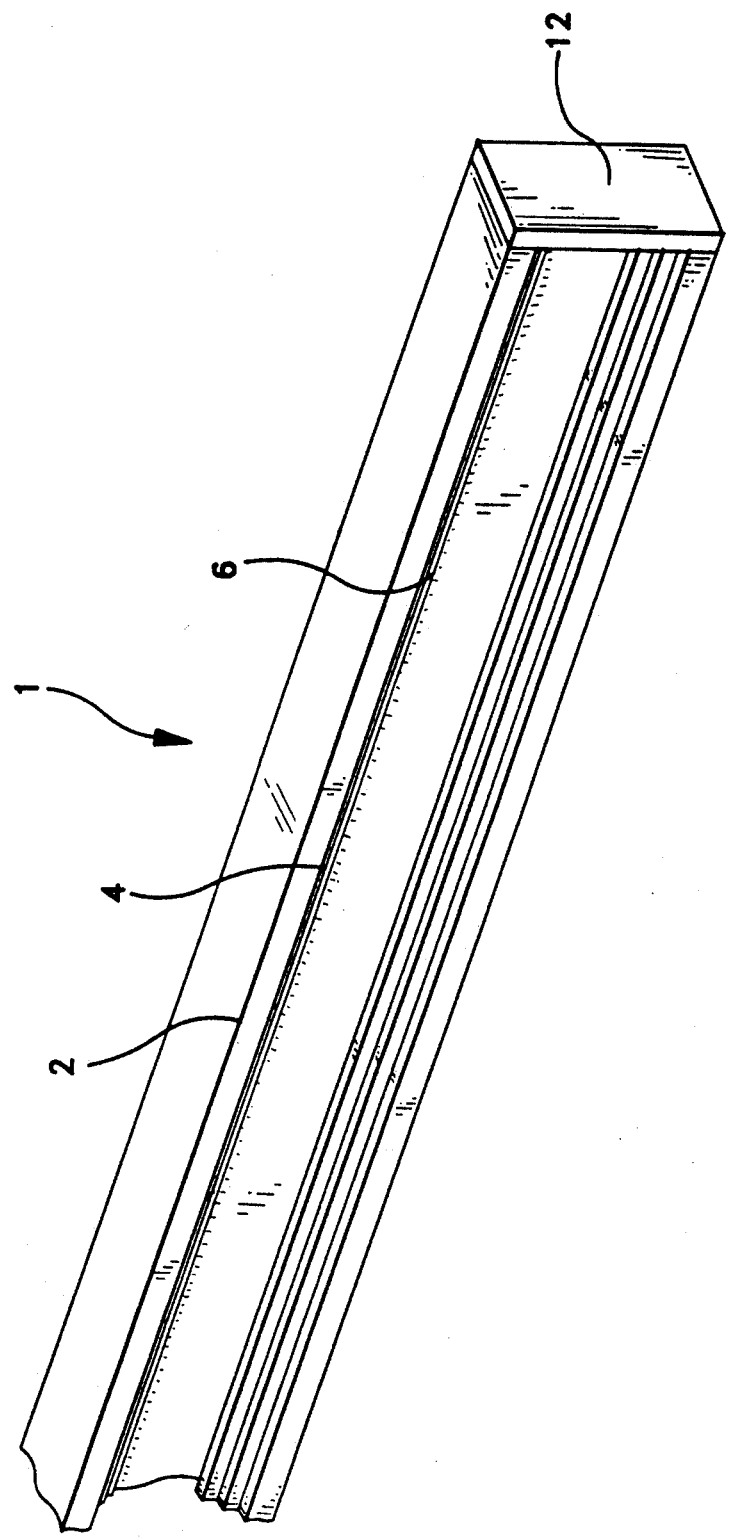
FIG. 2 is a fragmentary perspective view showing the components in a fully inwardly telescoped position.

With reference now to FIGS. 2 and 3, component 4 is shown fully inwardly telescoped in component 2 and component 6 is shown fully inwardly telescoped in component 4. Locking arrangements 8 and 10 (FIG. 3) lock components 4 and 6 in the fully inwardly telescoped position. Plate 12 abuts the evenly extending ends of components 2, 4 and 6 and level 1 assumes a finite length suitable for portability or storage, as the case may be.

Locking arrangements 8 and 10 will be next described with reference to FIG. 4, with locking arrangement 8 being specifically referred to for purposes of illustration.

Locking arrangement 8 includes a cylindrical sleeve 22 captured between upper and lower edges 4A and 4B, respectively, of level component 4 near the inwardly extending end 4C thereof. A plunger 24 having a pin tip 26 is disposed in one end of sleeve 22 and a plunger 28 having a pin tip 30 is disposed in the opposite end of the sleeve. Component 4 has a hole 32 extending through edge 4A and a hole 34 aligned with hole 32 extending through edge 4B. The diameters of holes 32 and 34 are exaggerated in relation to the diameters of pin tips 26 and 30 in order to better illustrate this feature of the invention.

A spring 36 is disposed within sleeve 22 between plungers 24 and 28 so as to bias the plungers, whereby pin tips 26 and 30 extend through holes 32 and 34, respectively. Extending pin tip 26 engages a detent 38 in the lower surface of upper edge 2A of component 2 and extending pin 30 engages a detent 40 in the upper surface of lower edge 2B of component 2. Component 2 is thus locked in the position shown in FIG. 3. Locking arrangement 10 is like that of locking arrangement 8 just described to likewise lock component 6 in the position shown in FIG. 3 via detents 42 and 44 shown in the Figure.

When component 4 is telescoped as by a user outwardly from component 2, pin tips 26 and 30 override detents 38 and 40 and when component 6 is likewise telescoped outwardly from component 4, the respective pin tips (not otherwise shown) override detents 42 and 44, respectively. The overriding affect is achieved via the compression of spring 36 as will now be understood.

It will now be appreciated that locking arrangement 8 is carried by and moves with component 4 and locking arrangement 10 is carried by and moves with component 6. Thus, when component 4 is telescoped outwardly from component 2, component 4 will remain unlocked and hence telescopically moveable until other detents (not otherwise shown) carried by component 2 are engaged by pin tips 26 and 30, such as when component 4 is fully outwardly telescoped as shown in FIG. 1. Likewise, when component 6 is telescoped outwardly from component 4, component 6 will remain unlocked and telescopically movable until detents such as 46 and 48 in component 4 (FIG. 3) are engaged by corresponding pin tips of locking arrangement 10, such as when component 6 is fully outwardly telescoped as shown in FIG. 1.

Although the invention has been described in terms of components 4 and 6 being fully inwardly and outwardly telescoped, this description is by way of example and not by way of limitation. Thus, by appropriately disposing detents such as 38 and 40 in component 2, and 46 and 48 in component 4, any desired length of level 1 can be achieved. Indeed, components 2 and 4 can each carry a plurality of detents in spaced relation to provide a wide adjustable length of the level as will now be appreciated. It will also be appreciated that components 2 and 4 can be outwardly telescoped to a length wherein the respective locking means are between detents, so as to provide a yet wider adjustable length of the level, albeit without locking the components in position, as may be required from time to time.

In practicing the invention, components 2, 4 and 6 are preferably of aluminum, although other suitable materials may be used. An appropriate clearance between the several telescoping components has been found to be 0.003-0.004 inches to provide the required sliding telescopic action. When fully outwardly telescoped, the components should overlap approximately six inches for proper strength and rigidity of the extended level. In the preferred embodiment of the invention, components 2, 4 and 6 are approximately thirty inches in length. In this regard, it should be noted that consecutive components such as 2 and 4 should be of a length sufficient to clear any locking arrangements such as 8 and 10 when the level is fully telescoped inwardly, and to yet provide even outer ends for abutting plate 10 as shown in FIG. 3.

The above dimensions are noted by way of illustration and not by way of limitation and may be lesser or greater than noted. Further, although only three components have been shown for purposes of describing the invention, any number of components as is found to be practical are herein contemplated.

With the above description of the invention in mind, reference is made to the claims appended hereto for a definition of the scope of the invention.

What is claimed is:

1. A telescoping level, comprising:
a plurality of consecutive level components including a first component and a last component;
each of the components except the last component arranged to receive an immediately consecutive component in inwardly and outwardly telescoping fashion;
locking means carried by each of the components except the first component, including the component carrying the locking means having a pair of edges in parallel spaced relation and having inwardly extending ends, each of said carrying component edges having a through hole with said through holes being in aligned relation, a sleeve captured between the pair of carrying component edges near the inwardly extending ends thereof, a first plunger disposed within the sleeve at one end thereof and having a pin tip, and a second plunger disposed within the sleeve at the opposite end thereof and having a pin tip, a spring disposed between the plungers for biasing said plungers whereupon the pin tip of the first plunger extends through the through hole in one of the carrying component edges, and the pin tip of the second plunger extends through the through hole in the other of said carrying component edges; and
each of the components except the last component including means cooperating with the locking means carried by the immediately consecutive components received thereby for locking said received immediately consecutive components in an inwardly telescoped position, and including means cooperating with said locking means for locking said received immediately consecutive components in an outwardly telescoped position, wherein the component arranged to receive the immediately consecutive component has a pair of edges in parallel spaced relation, and each of said pair of receiving component edges is in outwardly spaced relation with a corresponding edge of a component carrying the locking means, each of said pair of receiving component edges carries a plurality of pairs of detents, each of said detents in said pairs of detents is in aligned relation with the other of said detents and said pairs of detents longitudinally spaced along said pairs of receiving component edges, and the pin tips of the first and second spring biased plungers engage corresponding pairs of detents when the received immediately consecutive component is inwardly telescoped and outwardly telescoped to lock said received immediately consecutive component in said inwardly and outwardly telescoped positions, respectively.

2. A telescoping level as described by claim 1, wherein:

the telescoping level has a finite length when each received consecutive component is locked in a fully inwardly telescoped position; and said telescoping level has an adjustable length when each received consecutive component is locked in an outwardly telescoped position.

3. A telescoping level as described by claim 1, wherein:

the cross-section of the first component is the largest cross-section of the cross-sections of the plurality of consecutive components;

said first component has a leveling surface and a surface carrying a leveling bubble;

the cross-sections of each of the other consecutive components are consecutively smaller, with the cross-section of the last element being the smallest cross-section;

said last component has an outwardly extending end;

a plate corresponding in size to the cross-section of the first component is secured to said outwardly extending end so as to be normal to the leveling surface of the first component, said plate has a leveling edge which is co-planar with said leveling surface; and the leveling surface and the leveling edge are disposed on a first structural surface to establish via the leveling bubble a horizontal plane for said first structural surface.

4. A telescopic surface as described by claim 2, wherein:

the plate has a plumbing surface;

the surface of the first component carrying the leveling bubble carries plumbing bubbles; and the plumbing surface is disposed against a second structural surface to establish a plumb line for said second structural surface.

5. A telescoping level as described by claim 1, wherein:

the pairs of detents are overridden when the received immediately consecutive component is outwardly and inwardly telescoped.

6. A telescoping level, comprising:

a plurality of consecutive level components including a first component and a last component;

each of the components except the last component arranged to receive an immediately consecutive component in telescoping fashion;

locking means carried by each of the components except the first component, including the component carrying the locking means having a pair of edges in parallel spaced relation and having inwardly extending ends, each of said carrying component edges having a through hole with said through holes being in aligned relation, a sleeve captured between the pair of carrying component edges near the inwardly extending ends thereof, a first plunger disposed within the sleeve at one end thereof and having a pin tip, and a second plunger disposed within the sleeve at the opposite end thereof and having a pin tip, a spring disposed between the plungers for biasing said plungers whereupon the pin tip of the first plunger extends through the through hole in one of the carrying component edges, and the pin tip of the second plunger extends through the through hole in the other of said carrying component edges; and each of the components except the last component including means cooperating with the locking means carried by the immediately consecutive components received thereby for locking said received immediately consecutive components in an inwardly telescoped position, wherein the component arranged to receive the immediately consecutive component has a pair of edges in parallel spaced relation, and each of said pair of receiving component edges is in outwardly spaced relation with a corresponding edge of a component carrying the locking means, each of said pair of receiving component edges carries a plurality of pairs of detents, each of said detents in said pairs of detents being in aligned relation with the other of said detents and said pairs of detents longitudinally spaced along said pairs of receiving component edges, and the pin tips of the first and second spring biased plungers engage corresponding pairs of detents when the received immediately consecutive component is inwardly telescoped and outwardly telescoped to lock said received immediately consecutive component in said inwardly and outwardly telescoped positions, respectively.

7. A telescoping level as described by claim 6, wherein:

the telescoping level has a finite length when each received consecutive component is locked in a fully inwardly telescoped position, and said telescoping level otherwise having an adjustable length.

8. A telescoping level comprising:

at least first, second and third consecutive level components;

the first and second components arranged to receive the second and third components, respectively, in inwardly and outwardly telescoping fashion;

locking means carried by the second and third components, including the component carrying the locking means having a pair of edges in parallel spaced relation and having inwardly extending ends, each of said carrying component edges having a through hole with said through holes being in aligned relation, a sleeve captured between the pair of carrying component edges near the inwardly extending ends thereof, a first plunger disposed within the sleeve at one end thereof and having a pin tip, and a second plunger disposed within the sleeve at the opposite end thereof and having a pin tip, a spring disposed between the plungers for biasing said plungers whereupon the pin tip of the first plunger extends through the through hole in one of the carrying component edges, and the pin tip of the second plunger extends through the through hole in the other of said carrying component edges; and the first and second components including means cooperating with the locking means carried by the second and third components, respectively, for locking the second and third components in the first and second components, respectively, in an inwardly telescoped position, and including means cooperating with said locking means for locking said second and third components in an outwardly telescoped position, wherein the first and second components have a pair of edges in parallel spaced relation, and each of said pair of edges being in outwardly spaced relation with a corresponding edge of the second and third components, respectively, each of said pair of edges carries a plurality of pairs of detents, each of said detents in said pairs of detents is in aligned relation with the other of said detents and said pairs of detents longitudinally spaced along said pairs of edges, and the pin tips of the first and second spring biased plungers engaging corresponding pairs of detents when the second and third components are inwardly telescoped and outwardly telescoped to lock said second and third components in the inwardly and outwardly telescoped positions, respectively.

* * * * *